United States Patent [19]
Takane

[11] Patent Number: 4,837,674
[45] Date of Patent: Jun. 6, 1989

[54] CIRCUIT ARRANGEMENT CAPABLE OF QUICKLY PROCESSING AN INTERRUPT IN A VIRTUAL MACHINE OPERATED BY A PLURALITY OF OPERATING SYSTEMS

[75] Inventor: Hisao Takane, Tokyo, Japan

[73] Assignee: NEC Corporation, Tokyo, Japan

[21] Appl. No.: 12,162

[22] Filed: Feb. 9, 1987

[30] Foreign Application Priority Data

Feb. 10, 1986 [JP] Japan ................................. 61-25979

[51] Int. Cl.⁴ ............................................. G06F 9/46
[52] U.S. Cl. ................................................. 364/200
[58] Field of Search ... 364/200 MS File, 900 MS File

[56] References Cited

U.S. PATENT DOCUMENTS 4,253,145  2/1981  Goldberg ........................... 364/200
4,400,769  8/1983  Kaneda et al. ..................... 364/200
4,493,034  1/1985  Angelle et al. .................... 364/200

Primary Examiner—Eddie P. Chan

Attorney, Agent, or Firm—Foley & Lardner, Schwartz, Jeffery, Schwaab, Mack, Blumenthal & Evans

[57] ABSTRACT

In a virtual machine comprising a plurality of execution processing units (15a, 15b) which may be operated in compliance with individual operating systems, an interrupt request is delivered from an I/O interrupt start circuit (24) to all of the execution processing units to make a destination one (15a) of the execution processing units carry out an interrupt processing operation. When an undestined one (15b) of the execution processing units responds to the interrupt request, the undestined processing unit initializes or enables the interrupt processing operation of the destination processing unit by the use of an interrupt start circuit (28b). Interrupt information related to the interrupt request is sent from an I/O write-in circuit (23) to a first retaining area (21) and moved from the first retaining area to a second retaining area (22) through the undestined processing unit. The destination processing unit starts the interrupt processing operation by the use of the interrupt information.

4 Claims, 2 Drawing Sheets

CIRCUIT ARRANGEMENT CAPABLE OF QUICKLY PROCESSING AN INTERRUPT IN A VIRTUAL MACHINE OPERATED BY A PLURALITY OF OPERATING SYSTEMS

BACKGROUND OF THE INVENTION

This invention relates to a circuit arrangement for use in a virtual machine to initialize an interrupt operation in response to an interrupt request.

In a virtual machine of the type described, a wide variety of processing can be executed in accordance with a plurality of operating systems under control of a control program in a time division fashion. The operating system will often be abbreviated to OS hereinunder. With the virtual machine, it is possible to evaluate the plurality of the operating systems and to change the operating systems from one to another with time.

In such a virtual machine, an interrupt or interruption request might often appear from an input/output device during execution of a certain one of the operating systems. The operating system under consideration may be referred to as a current operating system while an interrupt request from the input/output device may be called an input/output (I/O) interrupt request. For such an I/O interrupt request, an interrupt processing program is included in each operating system.

Herein, it is to be noted that the interrupt request in question may be destined or directed to one of the other operating systems that is different from the current operating system and that may be called an operating system in question. For this purpose, the control program monitors occurrence of each interrupt request and judges which one of the operating systems the I/O interrupt request is directed to. Thereafter, the control program starts the interrupt processing program included in the operating system in question. Regardless, occurrence of the interrupt request must be notified to the operating system in question.

In U.S. Pat. No. 4,764,864, the instant inventor, H. Takane, assignor to NEC Corporation, proposes a method of notifying the operating system in question of occurrence of an input/output interrupt request. However, this proposal is restricted to a virtual machine comprising a single execution processing unit. This means that no consideration is paid in the above-mentioned patent application to a virtual machine comprising a plurality of execution processing units.

When a plurality of execution processing units are included in a virtual machine, it has been found that specific processing must be executed when an input/output interrupt request is issued from the input/output device. For example, let a particular input/output interrupt request be produced so as to start the interrupt processing program included in a preselected one of the operating systems. In this event, the particular input/output interrupt request is not always received by a destination one of the execution processing units that is executing the preselected operating system.

If the particular input/output interrupt request is received by an undestined one of the execution processing units, the destination execution processing unit must be triggered to start the interrupt processing program of the preselected operating system which runs on the destination execution processing unit. Such an undestined one of the execution processing units may be named a reception processing unit.

To this end, a conventional idea might be that a dummy input/output request is supplied to the input/output device from the reception processing unit in order to make the input/output device produce an additional input/output interrupt request again and to deliver the additional input/output interrupt request to the destination execution processing unit.

Such delivery of the additional input/output interrupt request may serve to start the interrupt processing program of the preselected operating system. However, the input/output device and the reception processing unit must carry out useless input/output operation on occurrence of the input/output interrupt request. This results in an increase of overhead of processing and a reduction of throughput in the virtual machine.

SUMMARY OF THE INVENTION

It is an object of this invention to provide a circuit arrangement which can conveniently carry out an interrupt operation in a virtual machine which comprises a plurality of execution processing units.

It is another object of this invention to provide a circuit arrangement of the type described, which can reduce overhead of processing and can increase throughput of the virtual machine.

It is a further object of this invention to provide a circuit arrangement of the type described, which can dispense with useless input/output operation in an input/output device and a reception processing unit.

A circuit arrangement to which this invention is applicable is for use in a virtual machine comprising a main memory, an input/output device, and a plurality of execution processing units. The virtual machine is operable in accordance with a plurality of operating systems. The circuit arrangement is responsive to an interrupt request which indicates an interrupt processing operation to be carried out in a preselected one of the execution processing units. According to this invention, the circuit arrangement comprises first means included in the input/output means for supplying the interrupt request to each of the execution processing units to make a receivable one of the execution processing units respond to the interrupt request and second means included in each of the execution processing units for initializing the interrupt processing operation in the preselected one of the execution processing units when the receivable one of the execution processing units is different from the preselected one of the execution processing units.

DESCRIPTION OF THE PREFERRED EMBODIMENT

Figure 1:
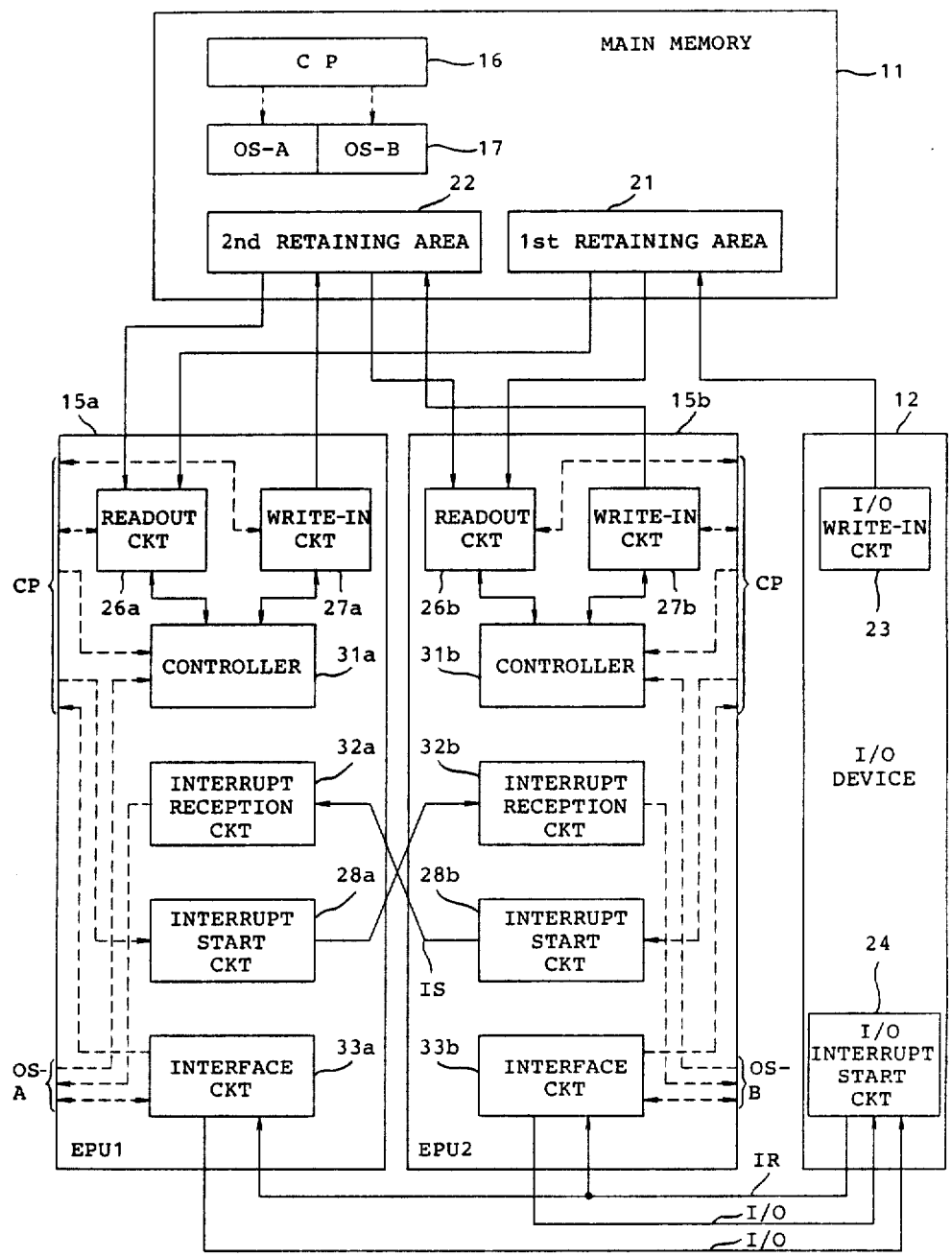
FIG. 1 shows a block diagram of a virtual machine comprising a circuit arrangement according to a preferred embodiment of this invention.

Referring to FIG. 1, description will be made about a virtual machine comprising a main memory 11, an input/output (I/O) device 12, and first and second execution processing units 15a and 15b each of which may be recognized as a real or hardware execution processing unit and which may be identical in hardware structure with each other. The first and second execution processing units 15a and 15b may be abbreviated to EPU1 and EPU2, respectively. The illustrated virtual machine comprises a circuit arrangement according to a preferred embodiment of this invention. The circuit arrangement is interspersed in the virtual machine in a manner to be described later and serves to execute interrupt processing or operation, as will become clear later. For brevity of description, an illustration is made in FIG. 1 only about hardware circuits and software concerned with the circuit arrangement.

In FIG. 1, the main memory 11 has a first memory area 16 for storing a control program CP and a second memory area 17 for storing first and second operating systems which are abbreviated to OS-A and OS-B, respectively. The first and the second processing units 15a and 15b are controlled by the control program CP. Herein, let the first and the second processing units 15a and 15b execute the first and the second operating systems OS-A and OS-B, respectively, each of which includes an interrupt processing program. For convenience of description, control of the control program CP and the first and the second operating systems OS-A and OS-B is specified by broken lines in the first and the second execution processing units 15a and 15b. In addition, the control program CP can also access the first and the second operating systems OS-A and OS-B. Such an access operation of the control program CP is symbolized by broken lines in a block of the main memory 11.

The illustrated main memory 11 further has first and second retaining areas 21 and 22 for retaining first and second interrupt information signals in a manner which will be described later, respectively. The first and the second retaining areas 21 and 22 are operable as a part of the circuit arrangement according to this invention.

The input/output device 12 illustrated in FIG. 1 is specified by an I/O write-in circuit 23 and an I/O interrupt start circuit 24 both of which are operable as another part of the circuit arrangement. The I/O interrupt start circuit 24 is triggered by an I/O request I/O which is produced by each of the first and the second execution processing units 15a and 15b. As a result, an I/O interrupt request IR is delivered from the I/O interrupt start circuit 24 to both of the first and the second execution processing units 15a and 15b.

Each of the first and the second execution processing units 15a and 15b comprises a readout circuit 26 coupled to the first and the second retaining areas 21 and 22, a write-in circuit 27 coupled to the second retaining area 22, and an interrupt start circuit 28 which will become clear later. In addition, each of the first and the second execution processing units 15a and 15b further comprises a controller 31 implemented by a hardware circuit, an interrupt reception circuit 32 coupled to the interrupt start circuit 28 of the other execution processing unit, and an interface circuit 33 coupled to the input/output device 12. In order to distinguish between the first and the second execution processing units 15a and 15b, suffixes a and b are attached to the above-mentioned circuit elements of the first and the second execution processing units 15a and 15b, respectively.

Figure 2:
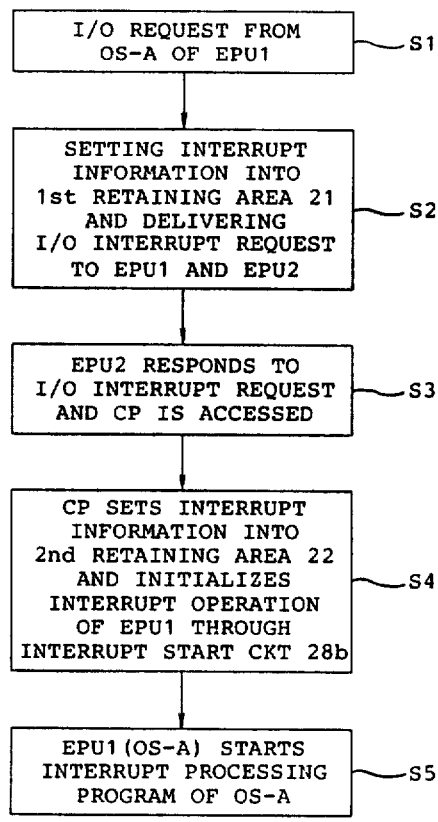
FIG. 2 shows a flow chart for use in describing operation of the circuit arrangement illustrated in FIG. 1.

Referring to FIG. 2 together with FIG. 1, description will be made about interrupt operation of the virtual machine. In this connection, it is assumed that the first and the second operating systems OS-A and OS-B are executed in the first and the second execution processing units 15a and 15b, respectively, and that the I/O request I/O is sent from the first execution processing unit 15a under control of the first operating system OS-A. The I/O request I/O is sent through the interface circuit 33a to the I/O interrupt start circuit 24 at a first step S1, as shown in FIG. 2.

The first step S1 is followed by a second step S2 which is processed in the input/output device 12 triggered by the I/O request I/O. At the second step S2, input/output processing is at first carried out by the input/output device 12. Subsequently, interrupt information is sent from the I/O write-in circuit 23 to the first retaining area 21 and is stored as the first interruption information signal in the first retaining area 21. Under the circumstances, the I/O interrupt request IR is delivered from the I/O interrupt start circuit 24 to the first and the second execution processing units 15a and 15b.

It is surmised that the interrupt information stored as the first interrupt information signal is directed to the first operating system OS-A and therefore indicates interruption of the first operating system OS-A. Accordingly, it may be said that the I/O interrupt request IR is destined to the first execution processing unit 15a to interrupt the first operating system OS-A. It is further surmised that the interrupt request IR is received by the interface circuit 33b of the second execution processing unit 15b which is executing the second operating system OS-B, in spite of the fact that the I/O request I/O is produced by the first execution processing unit 15a.

In this situation, the second step S2 is succeeded by a third step S3 which is carried out in the second execution processing unit 15b. Responsive to the interrupt request IR, the interface circuit 33b of the second execution processing unit 15b accesses the control program CP, as shown by a broken line in FIG. 1. The first interrupt information signal is moved from the first retaining area 21 to the readout circuit 26b of the second execution processing unit 15b in cooperation with the controller 31b and is read out of the readout circuit 26b under control of the control program CP, as shown by a broken line. The control program CP recognizes that the first interrupt information signal is to be processed by the first operating system OS-A executed in the first execution processing unit 15a. Thus, the second execution processing unit 15b is judged as an undestined processing unit while the first execution processing unit 15a is judged as a destination processing unit.

When the I/O interrupt request IR is received by the undestined processing unit, namely, the second execution processing unit 15b and the control program CP recognizes that the interrupt information is destined to a different operating system, namely, the first operating system OS-A, as mentioned before, the third step S3 is followed by a fourth step S4. At the fourth step S4, the interrupt information is set into the write-in circuit 27b to be moved to the second retaining area 22 under control of the control program CP. The resultant interrupt information is stored as the second interrupt information signal in the second retaining area 22. Furthermore, the interrupt start circuit 28b is driven by the control program CP to send an interrupt start signal IS from the interrupt start circuit 28b to the interrupt reception circuit 32a of the first execution processing unit 15a. As a result, the interrupt processing operation is initialized or enabled in the first execution processing unit.

Thus, the undestined execution processing unit, such as the second execution processing unit 15b, directly accesses the destination execution processing unit, such as the first execution processing unit 15a, through a specific line between the first and the second execution processing units 15a and 15b. This means that no input-/output operation is necessary in the input/output device 12 even when the I/O interrupt request IR is received by the undestined execution processing unit.

A fifth step S5 is carried out in the first execution processing unit 15a after completion of the fourth step S4 so as to start the interrupt processing program of the first operating system OS-A which is executed in the first execution processing unit 15a. More specifically, the second interrupt information signal is read out of the second retaining circuit 22 and stored in the readout circuit 26a of the first execution processing unit 15a under control of the control program CP. Thereafter, the interrupt processing program of the first operating system OS-A is accessed by the control program to carry out or start the interrupt processing operation.

As is readily understood from the above, the I/O interrupt start circuit 24 may serve to supply the I/O interrupt request IR to make one of the execution processing units 15a and 15b respond to the I/O interrupt request and may be referred to as a first circuit for interrupt processing operation. The interrupt start circuit 28b is operable to initialize the interrupt processing operation in the destined processing unit and may be referred to as a second circuit for the interrupt processing operation. The I/O write-in circuit 23 is operable to produce the interrupt information and may be called a third circuit.

On the other hand, let the first execution processing unit 15a respond to the I/O interrupt request IR at the third step S3 when the I/O interrupt request IR intends to access the first operating system OS-A which is executed in the first execution processing unit 15a. In this case, the control program CP is accessed through the interface circuit 33a of the first execution processing unit 15a in the above-mentioned manner. Therefore, the first interrupt information signal is moved from the first retaining area 21 to the readout circuit 26a of the first execution processing unit 15a and is set into the second retaining area 22 through the write-in circuit 27a under control of the control program CP. Under the circumstances, the control program CP judges that the second interrupt information signal is for interrupting the first execution processing unit 15a. Thereafter, the control program CP starts the interrupt processing operation of the first execution processing unit 15a. The first execution processing unit 15a reads the second interrupt information signal out of the second retaining area 22 by the use of the readout circuit 26a to start the interrupt processing program of the first operating system OS-A.

Similar interrupt operation is carried out when the second operating system OS-B sends the I/O request to the input/output device. Therefore, such interrupt operation will not be described any longer.

As mentioned above, when the I/O interrupt request is not received by a destination execution processing unit but an undestined execution processing unit, the interrupt processing operation of the destination execution processing unit is directly started by the undestined execution processing unit. This implies that the input/output device is not supplied with any dummy input/output request from the undestined execution processing unit. Accordingly, it is possible with this invention to realize an effective virtual machine because extra input/output operation becomes unnecessary in the input/output device and the undestined execution processing unit.

While this invention has thus far been described in conjunction with a preferred embodiment thereof, it will readily be possible for those skilled in the art to put this invention into practice in various other manners. For example, the number of the execution processing units may be greater than two. In this event, each interrupt start circuit 28 of the execution processing units is connected to all of the other interrupt reception circuits and the control program CP makes each interrupt start circuit 28 deliver the interrupt start signal to a destination one of the other interrupt reception circuits. The number of the operating systems may also be greater than two. In addition, the controller 31 may be operated in cooperation with the control program CP to control the readout circuit 26 and the write-in circuit 27.

What is claimed is:

1. A circuit arrangement for use in a virtual machine which comprises a main memory connected to an input/output device, and a plurality of execution processing units and which is operable in accordance with a plurality of operating systems, said circuit arrangement being responsive to an interrupt request which indicates an interrupt processing operation to be carried out in a preselected one of said execution processing units, wherein the circuit arrangement comprises:

first means included in said input/output device for supplying said interrupt request simultaneously to each of said execution processing units so that only a receivable one of said execution processing units responds to said interrupt request; and second means included in each of said execution processing units and coupled to said main memory and interruption reception circuit of the other execution processing unit, said second means of said receivable processing unit cooperating with a control program in said main memory for generating an interrupt start signal for directly starting said interrupt processing operation in said preselected one of the execution processing units when said receivable one of the execution processing units is different from said preselected one of the execution processing units.

2. A circuit arrangement as claimed in claim 1, further comprising:

third means included in said input/output means for producing interrupt information related to said interrupt request;

said circuit arrangement comprising, in said main memory:

a first retaining area for storing said interrupt information as a first interrupt information signal on production of said interrupt request; and a second retaining area coupled to said plurality of the execution processing units for storing said interrupt information as a second interrupt information signal through said receivable one of the execution processing units so as to transmit said second interrupt information signal to said preselected one of the execution processing units.

3. A circuit arrangement as claimed in claim 2, further comprising, in each of said execution processing units:

readout means for selectively reading said first and said second interrupt information signals out of said first and said second retaining areas, respectively; and write-in means for writing the interrupt information into said second retaining area as said second interrupt information signal.

4. A method of carrying out an interrupt processing operation in a virtual machine which comprises a main memory connected to an input/output device, and a plurality of execution processing units and which is operable in accordance with a plurality of operating systems, said interrupt processing operation to be carried out in a preselected one of said execution processing units in response to an interrupt request, wherein the method comprises the steps of:

supplying said interrupt request from said input/output device simultaneously to each of said execution processing units so that only a receivable one of said execution processing units responds to said interrupt request;

in cooperation with a control program in said main memory, generating in said receivable one of said execution processing units an interrupt start signal;

transmitting said interrupt start signal directly to an interrupt reception circuit of said preselected one of said execution processing units without utilizing said input/output device; and starting said interrupt processing operation in said preselected one of the execution processing by said preselected one of said execution processing units responding to said interrupt start signal.

* * * * *